United States Patent
Hunte

(12) 
(10) Patent No.: US 6,665,538 B1
(45) Date of Patent: Dec. 16, 2003

(54) METHOD FOR THE DETERMINATION OF CELL BORDERS IN CELLULAR DATA COMMUNICATIONS SYSTEMS

(75) Inventor: Torsten Hunte, Nacka (SE)

(73) Assignee: Telefonaktiebolaget LM Ericsson (publ), Stockholm (SE)

( * ) Notice: Subject to any disclaimer, the term of this patent is extended or adjusted under 35 U.S.C. 154(b) by 371 days.

(21) Appl. No.: 09/637,836

(22) Filed: Aug. 11, 2000

(30) Foreign Application Priority Data

Aug. 12, 1999 (GB) .............................................. 9919073

(51) Int. Cl.⁷ ................................................ H04Q 7/00
(52) U.S. Cl. ...................................... 455/446; 455/436
(58) Field of Search ............................... 455/446, 436, 455/449, 67.1, 423, 424, 425; 370/329

(56) References Cited

U.S. PATENT DOCUMENTS

| | | | |
|---|---|---|---|
| 5,784,362 A | | 7/1998 | Turina |
| 6,081,717 A | * | 6/2000 | Shah et al. .................. 455/446 |
| 6,148,209 A | * | 11/2000 | Hamalainen et al. ....... 455/450 |
| 6,167,031 A | * | 12/2000 | Olofsson et al. ............ 370/252 |
| 6,167,037 A | * | 12/2000 | Higuchi et al. ............. 370/335 |
| 6,188,894 B1 | * | 2/2001 | Clancy ....................... 455/423 |
| 6,377,809 B1 | * | 4/2002 | Rezaiifar et al. ........... 455/455 |

FOREIGN PATENT DOCUMENTS

| | | |
|---|---|---|
| GB | 2 314 731 A | 1/1998 |
| WO | 95/28808 | 10/1995 |
| WO | 96/21983 A1 | 7/1996 |
| WO | 97/06648 | 2/1997 |
| WO | 97/23110 | 6/1997 |
| WO | 98/56203 | 12/1998 |
| WO | 99/60796 | 11/1999 |

OTHER PUBLICATIONS

International Search Report, dated Dec. 4, 2000.
Great Britain Search Report, dated Feb. 23, 2000.
Novelty Search Report.

* cited by examiner

*Primary Examiner*—Nay Maung
*Assistant Examiner*—Alan T. Gantt

(57) ABSTRACT

The present invention provides method and apparatus for determining a cell border between first (A) and second (B) cells in a cellular communications system, such as GPRS, in which communications with mobile stations (1, 1H) can be effected at different effective transfer rates (CS1 to CS4) in dependence upon communication conditions, and can be handed over from the first cell (A) to the second cell (B). Information relating to the transfer rates (CS1 to CS4) of communications with mobile stations immediately before and after cell handover from the first cell (A) to the second cell (B) is stored. The stored information is subject to analysis and processing, and in dependence on the results the cell border between the first (A) and the second (B) cell is determined such that, at handover, transfer rates (CS1 to CS4) before and after handover are more likely or most likely to be the same.

9 Claims, 6 Drawing Sheets

---

STEP A

RECORD HISTORY STATISTICS OF CODING SCHEMES IN USE BEFORE AND AFTER CELL HANDOVERS, FROM CELL A TO CELL B, FROM CELL B TO CELL A, CELL A TO CELL C, CELL C TO CELL A, etc.

STEP B

PROCESS HISTORY STATISTICS TO DETERMINE WHETHER ADJUSTMENT OF CELL BORDERS (e.g. CELL A/CELL B, CELL B/CELL C) MAY PROVIDE A GREATER LIKELIHOOD OF THE SAME CODING SCHEME BEING USED BEFORE AND AFTER CELL HANDOVERS, TO PROVIDE MORE UNIFORM DATA THROUGHPUT (e.g. FEWER AND/OR LESS GREAT CHANGES IN THROUGHPUT AT CELL HANDOVER, GREATER OVERALL THROUGHPUT).

STEP C

GENERATE INFORMATION RELATING TO DETERMINE CELL BORDER ADJUSTMENTS.

STEP D

ON THE BASIS OR THE GENERATED INFORMATION, ADJUST CELL BORDERS.

REITERATE STEPS A TO D

FIG.2

CODING SCHEMES

| CODING SCHEME | DATA TRANSFER RATE kbits/sec | CODE RATE |
|---|---|---|
| CS1 | - 9.05 | 1/2 |
| CS2 | - 13.4 | 2/3 |
| CS3 | - 15.6 | 3/4 |
| CS4 | - 21.4 | 1 |

FIG. 3

BEFORE:

|  | TO CELL B ||||
|---|---|---|---|---|
|  | CS1 | CS2 | CS3 | CS4 |
| FROM CELL A — CS1 | 1% | 2% | 88% | 0% |
| CS2 | 1% | 3% | 5% | 0% |
| CS3 | 0% | 0% | 0% | 0% |
| CS4 | 0% | 0% | 0% | 0% |

AFTER:

|  | TO CELL B ||||
|---|---|---|---|---|
|  | CS1 | CS2 | CS3 | CS4 |
| FROM CELL A — CS1 | 1% | 2% | 0% | 0% |
| CS2 | 3% | 90% | 2% | 0% |
| CS3 | 0% | 2% | 0% | 0% |
| CS4 | 0% | 0% | 0% | 0% |

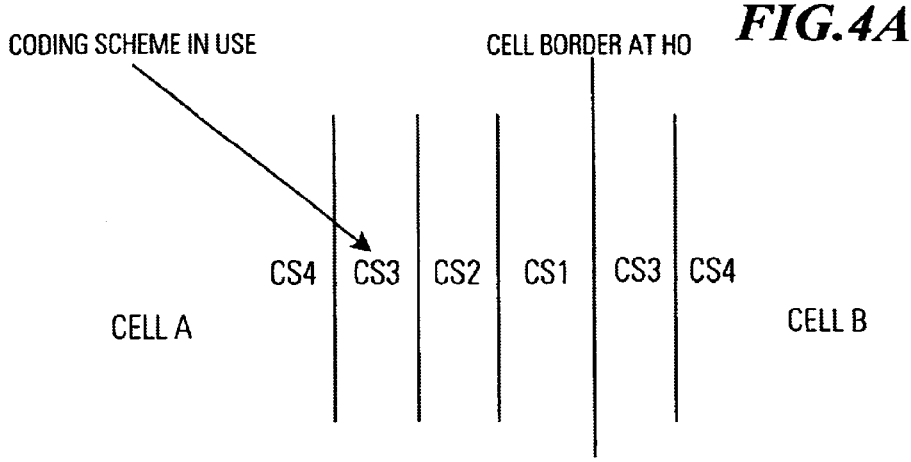
*FIG.4A*
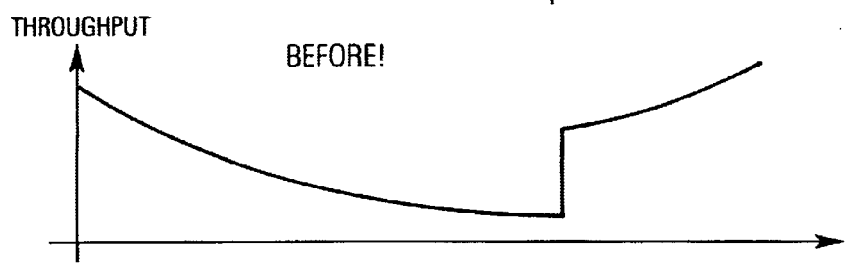
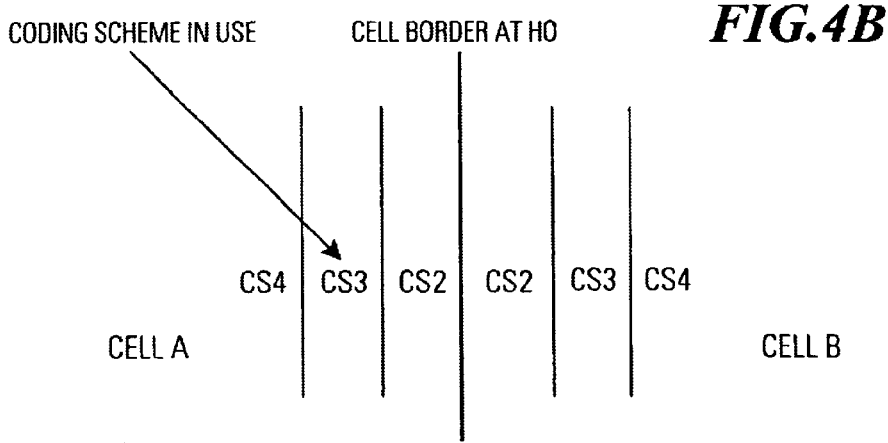
*FIG.4B*
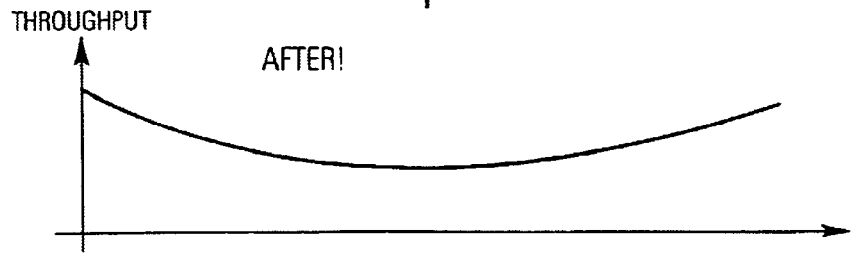

FIG.6

STEP A

RECORD HISTORY STATISTICS OF CODING SCHEMES IN USE BEFORE AND AFTER CELL HANDOVERS, FROM CELL A TO CELL B, FROM CELL B TO CELL A, CELL A TO CELL C, CELL C TO CELL A, etc.

STEP B

PROCESS HISTORY STATISTICS TO DETERMINE WHETHER ADJUSTMENT OF CELL BORDERS (e.g. CELL A/CELL B, CELL B/CELL C) MAY PROVIDE A GREATER LIKELIHOOD OF THE SAME CODING SCHEME BEING USED BEFORE AND AFTER CELL HANDOVERS, TO PROVIDE MORE UNIFORM DATA THROUGHPUT (e.g. FEWER AND/OR LESS GREAT CHANGES IN THROUGHPUT AT CELL HANDOVER, GREATER OVERALL THROUGHPUT).

STEP C

GENERATE INFORMATION RELATING TO DETERMINE CELL BORDER ADJUSTMENTS.

STEP D

ON THE BASIS OR THE GENERATED INFORMATION, ADJUST CELL BORDERS.

REITERATE STEPS A TO D

“METHOD FOR THE DETERMINATION OF CELL BORDERS IN CELLULAR DATA COMMUNICATIONS SYSTEMS

TECHNICAL FIELD OF THE INVENTION

The present invention relates to cellular communications systems, in particular to cellular data communications systems, and the determination of cell borders in such systems.

DESCRIPTION OF RELATED ART

Cellular communications systems such as GSM (Global System for Mobile Communications), AMPS (Advance Mobile Phone System) or D-AMPS (Digital Advance Mobile Phone System) are now well known. A characteristic of such cellular communications systems is that in the course of established communication sessions with mobile stations, for example mobile telephones, the mobile stations may move from one cell of the system to another cell so that the mobile station concerned communicates via different base stations, serving the different cells. Procedures and means for such "handover" of a communication from one cell or base station to another are known in the context of these cellular communications systems.

An important factor for the successful operation of cellular communications systems is the design of the cells of hence the determination of the borders between adjacent cells. Cell design, and the determination of cell borders, are in general based upon measurements made in the field, "by hand", of actual communications conditions in the cells of the system. The measurements may be, for example C/I (carrier/interference) measurements. These measurements, and any consequent adjustments to cell design, represent a significant overhead and cost factor for the operator of a mobile communications system. This is particularly so because measurements of actual communications conditions have to be repeated, because the characteristics of the communications system and the cells within the system change with time. For instance, new cells may be added to the system or changes in environmental factors may affect the characteristics of cells.

Cellular communications systems, originally primarily concerned with voice communications, are now being developed to more efficiently carry data communications. One development, conceived for supplementing GSM communications systems, is the GPRS (General Packet Radio System) cellular data communications system, which is a packet based data communications system. GPRS, and other cellular data communications systems, also face the need to hand over an on-going communication from a mobile station—in this case a mobile data terminal, such as a notebook computer or a multifunctional voice/data communications device—from one cell or base station to another. GPRS, and other cellular data communications systems, also require careful cell design setting of cell borders. These aspects of the communications system may be more vital for data communications in order for data to be transmitted at necessary higher rates in comparison with rates used for voice communications, to establish a satisfactory level of data throughput in the system.

A feature which cellular communications systems may offer, and which is provided by the GPRS data communications system, is the availability of different coding schemes for data transmitted in the system and the ability to dynamically change from one coding scheme to another. This is known as dynamic link adaptation. Thus, for example, the GPRS system offers four different coding schemes (for instance for downlink, i.e. base station to mobile station, communications), giving different levels of error protection to transferred data and/or different levels of redundancy in transmitted data signals. In the GPRS system, for example, the coding scheme used, and hence the effective data transfer rate, can be dynamically adapted for an established communications link using link adaptation functionality provided in the system. This link adaptation functionality may use, for example, reports transmitted from mobile stations to the system in response to an order from the system. Such a report may for instance contain information relating to the last transmitted series of radio blocks from the system to the mobile station. Information included may be carrier strength (C), interference (I), signal variance (Sign_VAR), block error rate and bit error rate. Depending on this information, link adaptation functionality can select the coding scheme, of those available, for a next sequence of radio blocks. Hence, the effective date transfer rate can be changed depending for example on the current communications (e.g. radio) situation.

PROBLEMS ADDRESSED BY THE PRESENT INVENTION

In a cellular communications system, in particular for data communications, the establishment of an efficient cell plan is a vitally important aspect of the system. The cell plan, i.e. the layout of cells, is a vital aspect of the system, especially for data communications. However, the effort and cost involved in establishing a cell plan, and adapting the cell plan as necessary to meet changed conditions, is a significant technical and economic burden on the system operator. If the cell plan is inappropriate to communication conditions generally applying to the areas covered by cells this can lead to acute inefficiencies in the system, so that the cost of monitoring the effectiveness of the cell plan, and adapting that plan, cannot be avoided.

In cellular communications systems, in particular for data communications, the provision of a satisfactory overall level of data throughput is also a matter of concern. Moreover, when a communications link has been established, if there is a change of data transfer rate in the link—for example at cell handover—the effects of this change of rate cannot always be predicted and may cause disruption of the data transfer.

SUMMARY (OF THE PRESENT INVENTION)

According to one aspect of the present invention there is provided a method of determining a cell border between first and second cells in a cellular communications system in which communications with mobile stations can be effected at different effective transfer rates in dependence upon communication conditions with the mobile stations, and in which on-going communications with the mobile stations can be handed over from the first cell to the second cell, the method comprising storing information relating to the transfer rates of communications with mobile stations prior to cell handover of those communications from the first cell to the second cell, storing information relating to transfer rates of the communications with mobile stations subsequent to the cell handover of the respective communications concerned from the first cell to the second cell, analyzing and processing the stored information, and in dependence thereupon determining the cell border between the first and the second cell such that, at communication handover, transfer rates before and after handover are more likely or most likely to be the same.

According to another aspect of the present invention there is provided apparatus for determining a cell border between first and second cells in a cellular communications system in which communications with mobile stations can be effected at different effective transfer rates in dependence upon communication conditions with the mobile stations, and in which on-going communications with the mobile stations can be handed over from the first cell to the second cell, the apparatus comprising > means for storing information relating to the transfer rates of communications with mobile stations prior to cell handover of those communications from the first cell (A) to the second cell (B),
> 
> means for storing information relating to transfer rates of the communications with mobile stations subsequent to the cell handover of the respective communications concerned from the first cell to the second cell,
> 
> means for analyzing and processing the stored information, and in dependence thereupon providing for determination of the cell border between the first and the second cell such that, at communication handover, transfer rates before and after handover are more likely or most likely to be the same.

Method and apparatus in accordance with the present invention can be particularly well employed in cellular data communications systems such as GPRS systems.

With method and apparatus in accordance with the present invention, when a cell border between first and second cells has been determined such that, at communication handover, transfer rates before and after handover are more likely to be the same than is the case with the presently set cell border (e.g. a more efficient cell border or cell plan has been determined because the presently set cell border does not provide that transfer rates before and after handover are most likely to be the same) actual adaptation of the cell border can be handled in a variety of different ways. For example, the system operator may be notified that a cell border change appears to be advisable but whether or not actual adaptation of cell border takes place may be left for the system operator to decide. Alternatively, the a cell border change may be effected automatically by changing parameters in base station controllers or other facilities in the system.

With method and apparatus in accordance with the present invention analysis of stored information, for determination of a more efficient cell border or cell plan, can be carried out at appropriate intervals. For example, the intervals may be set by the system operator, e.g. once every hour or once every day, or the intervals may vary in length for example such that analysis and determination takes place whenever enough information has been stored for useful statistical analysis.

SOLUTION PROVIDED BY THE PRESENT INVENTION

The inventor has had the insight that if there is recorded a history of, for example, coding schemes selected by dynamic link adaptation at (i.e. immediately before and after) cell handover, this recorded history can be analysed and processed to reveal inefficiencies in the cell plan of a cellular communications system and to determine adjusted cell borders to reduce or minimize such inefficiencies.

ADVANTAGES OF THE PRESENT INVENTION

The present invention offers a means of automatically determining or setting or adapting the cell plan of a cellular data communications system using information readily available from the system, without the need for "by hand" measurement and without the need for costly or complicated additional features or equipment in the system. The present invention this provides that the effort and cost involved in determining and/or maintaining an appropriate cell plan, and in determining and/or effecting necessary adaptations to cell borders, can be significantly reduced.

The present invention can also provide for improvement in overall throughput in a communications system, which is of particular significance in the context of cellular data communications systems such as GPRS. Moreover, the present invention can reduce or minimize changes in data rates in on-going communications links at cell handover and thereby reduce the risk of disruption to data transfer.

BRIEF DESCRIPTION OF THE DRAWINGS

FIG. 2 is a table illustrating the different coding schemes, data transfer rates and code rates employed in a GPRS data communications system, FIG. 3 is a schematic tabular or matrix representation of statistics of coding rates employed, in a GPRS data communications system, before and after a handover from Cell A to Cell B, illustrating the effects of the present invention in "BEFORE" and "AFTER" tables or matrices which relate to statistics of coding rates before and after a cell border adjustment by means of the present invention, FIGS. 4A and 4B each provide a conceptual indication of cell border at handover, in relation to coding schemes, and a graphical illustration of throughput at cell handover, and correspond respectively to the situations before and after a cell border adjustment by means of the present invention, FIG. 6 is a flow chart illustrating steps involved in a method embodying the present invention.

DETAILED DESCRIPTION OF EXEMPLARY EMBODIMENTS

Figure 1:
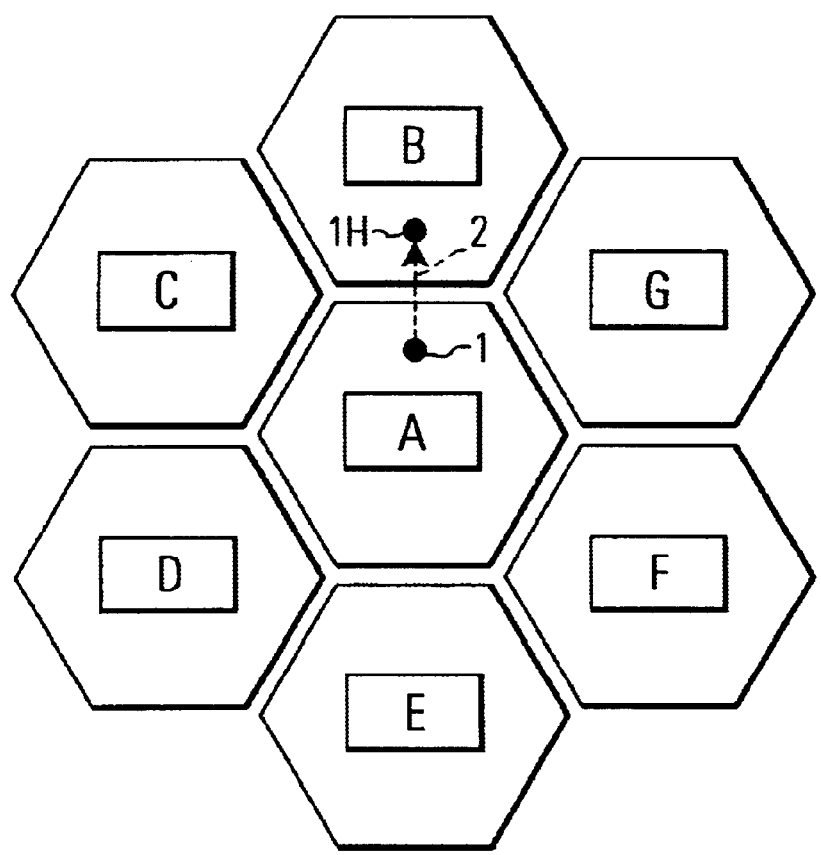
FIG. 1 is a simplified schematic illustration of cells in a cellular communications system.

FIG. 1 is simplified schematic illustration of cells A, B, C, D, E, F, and G, in a cellular communications system. Within each cell the base station responsible for communications in that cell is similarly labelled A, B, C, D, E, F, and G. A mobile station 1, initially within the bounds of Cell A communicates by way of base station A. When the mobile station moves from cell A to cell B, as indicated by arrow 2, responsibility for communication with the mobile station (1H) is handed over to base station B as the mobile station crosses the effective communications boundary between cells A and B. The situation is, of course, similar when a mobile station crosses from cell A to cell C, or from any one cell to an adjacent cell. For the purpose of simplification, reference will in general be made in the following only to cells A and B. Means and methods of handling such cell handovers are well known to those skilled in the art.

GPRS, as mentioned above, is one example of a cellular data communications system offering different coding schemes for the transfer of data. GPRS is a packet based data communications system, intended to extend present GSM cellular communication systems, and offers four different coding schemes (for instance for downlink, i.e. base station to mobile station, communications), CS1, CS2, CS3 and CS4, which provide useful data transfer rates of 9.05, 13.4, 15.6 and 21.4 kbits/sec (code rates 1/2, 2/3, 3/4 and 1), as illustrated in the Table of FIG. 2.

A cellular data communications system such as GPRS will have to contend with more or less adverse communication conditions and the different coding schemes for data carried, which can be selected depending on the adversity of the communications conditions encountered at any given time for a transfer of data, increase the availability and robustness of the system. In general, the aim of offering different coding schemes, and hence different useful data transfer rates, is to ensure—as far as is feasible—that data communications are possible even in adverse communications conditions, albeit perhaps at a lower useful data transfer rates, whilst adopting higher useful data transfer rates when communications conditions are more favourable.

Data communications systems, such as GPRS, can provide for dynamic selection of the coding scheme used, and hence dynamic adaptation of the useful data transfer rate, depending upon current communication conditions. This so-called dynamic link adaptation enables the system to opportunistically increase the data transfer rate of an established link when conditions allow, and retreat to a lesser transfer rate when conditions are more adverse.

This dynamic link adaptation may be based on reports from the receiving terminal or mobile station to a base station, concerning quality of reception of a current message or sequence of radio blocks, which can then affect subsequent transmissions or radio blocks sent from the base station to the mobile station to cause a different coding scheme to be used. For example, dynamic link adaptation may use reports transmitted from mobile stations to the system in response to and order from the system. Such a report may for instance contain information relating to the last transmitted series of radio blocks from the system to the mobile station. Information included may be carrier strength (C), interference (I), signal variance (Sign_VAR), block error rate and bit error rate. Depending on this information, link adaptation functionality can select the coding scheme, of those available, for a next sequence of radio blocks. However, it should be understood that the details of the procedure, method or means used to assess communications links are not directly relevant to the present invention: it is relevant only that some means of assessment are available. Likewise, the procedure, method or means used to dynamically adapt communications links to use different coding schemes or useful data transfer rates are not of direct relevance to the present invention: it is relevant only that dynamic adaptation of the communications links is possible and that information concerning the dynamic adaptations is made available and can be stored as a "history" of the system, for example as historical statistics of the usage of different coding schemes in the GPRS system. The present invention can effectively exploit any mode of dynamic link adaptation and any form of history of such adaptation. In effect, in a system in accordance with the present invention, any means or method of monitoring effectiveness of established data communications links may be used as a basis for selection of the best possible momentary data transfer mode for current communication conditions, and any form of history recordal of the selections made can be used as a basis for the present invention.

Exemplary embodiments of the invention will now be described with reference to GPRS and its four different coding schemes.

The leftmost table or matrix, labelled "BEFORE", in FIG. 3, indicates a history of coding schemes selected by link adaptation functionality before and after a cell change or handover of a mobile station from one cell, Cell A, to another cell, Cell B. That is, the table or matrix contains historical statistics of coding schemes at cell handover.

For example, the "BEFORE" table or matrix in FIG. 3 indicates that when a mobile data communications station, having an established communications channel through the system, moves from Cell A to Cell B, in only 1% of cases was the CS1 coding scheme selected by the dynamic link adaptation functionality before handover from Cell A to Cell B, and also selected after handover from Cell A to Cell B. Similarly, in only 3% of cases was the CS2 coding scheme selected before handover from Cell A to Cell B, and also selected after handover.

The "BEFORE" table or matrix of FIG. 1 shows, however, that in 88% of cases there was a change, on handover from Cell A to Cell B, from coding scheme CS1 to coding scheme CS3. That is, with the "BEFORE" cell plan effective, in 88% of cases there was a change from a less effective coding scheme (CS1—9.05 kbits/sec) to a more effective coding scheme (CS4—21.4 kbits/sec) on handover of a mobile communications station from Cell A to Cell B. Thus, as illustrated by the graphical representation of date throughput in the lower part of FIG. 4A ("Before!"), data throughput has generally increased on handover from Cell A to Cell B. In other words, as illustrated by the schematic in the upper part of FIG. 4A, the cell border at handover (HO) was positioned at a conceptual interface between CS1 and CS3 throughput rates, so that typically there was an abrupt change of coding scheme, and effective data throughput rate, on handover.

In accordance with the present invention, method and apparatus are provided for maintaining a history of coding scheme changes at handover, i.e. for establishing in memory, a table or matrix such as is illustrated by "BEFORE" in FIG. 1. The period of time over which the history is recorded in the stored matrix information may be chosen as necessary in the specific context concerned, for example dependent upon the level of traffic carried or other considerations. For example, the period of time may be set by the system operator, e.g. an hour or day, or may vary in length in accordance with the time needed for the stored information to be useful for statistical analysis.

The present invention also provides method and apparatus for analyzing and processing the stored history of coding scheme changes to determine whether a change or adaptation of cell border, for example between cells A and B could provide a more favourable cell plan.

The present invention then provides for determination or adaptation of the cell border, without need for measurements in the field "by hand", on the basis of the analysis of the stored history.

In one embodiment of the present invention, after recording at least sufficient history information ("BEFORE") for useful statistical analysis, it is determined in which direction—towards cell A or towards cell B—the cell border should be adjusted on the following basis:

if the most prevalent ("BEFORE") coding scheme used in cell A offers a higher data transfer rate than the ("BEFORE") most prevalent coding scheme then used in cell B after handover—i.e. coding scheme for cell A>coding scheme for cell B (e.g. CS3 in cell A and CS2 in cell B), then a border adjustment towards cell B is determined/proposed, and if the most prevalent ("BEFORE") coding scheme used in cell A offers a lower data transfer rate than the ("BEFORE")

most prevalent coding scheme then used in cell B after handover—i.e. coding scheme for cell A<coding scheme for cell B (e.g. CS3 in cell A and CS4 in cell B), then a border adjustment towards cell A is determined/proposed.

The effect of the present invention is illustrated by the "AFTER" table or matrix of FIG. 3.

The "AFTER" table or matrix of FIG. 1 shows that, after adaptation of the cell border in accordance with the present invention, in accordance with the prior history of coding scheme transitions at cell handover, in 90% of cases there will be no change, on handover from Cell A to Cell B, in coding scheme (i.e. effective data transfer rate) There may still be, for example in 2% of cases, a change from coding scheme CS1 to coding scheme CS2 and there may be in other minor percentages of cases other changes of coding scheme on cell handover. However, with the "AFTER" cell plan effective, in 90% of cases there will be no change of a coding scheme. Thus, as illustrated by the graphical representation of data throughput in the lower part of FIG. 4B, data throughput will generally manifest no abrupt change on handover from Cell A to Cell B. In other words, as illustrated by the schematic in the upper part of FIG. 4B, the cell border at handover (HO) is positioned at a conceptual interface between CS2 and CS2 throughput rates, providing consistency and continuity on cell handover.

In this way, a more homogeneous cell plan, providing a more constant, and generally higher, data throughput can be provided. "By hand" measurements of data transfer conditions are not needed, and readjustment and optimisation of the cell plan can be effected in a more automatic manner. This affords network operators reduced costs of operation an maintenance of the data transfer network and a more homogeneous network with more uniform data throughput for users. In effect, with the present invention the system or cell structure of the system becomes more self-configuring, with consequent reduced operation and maintenance costs for the operator, and more reliable services for the user.

Figure 5:
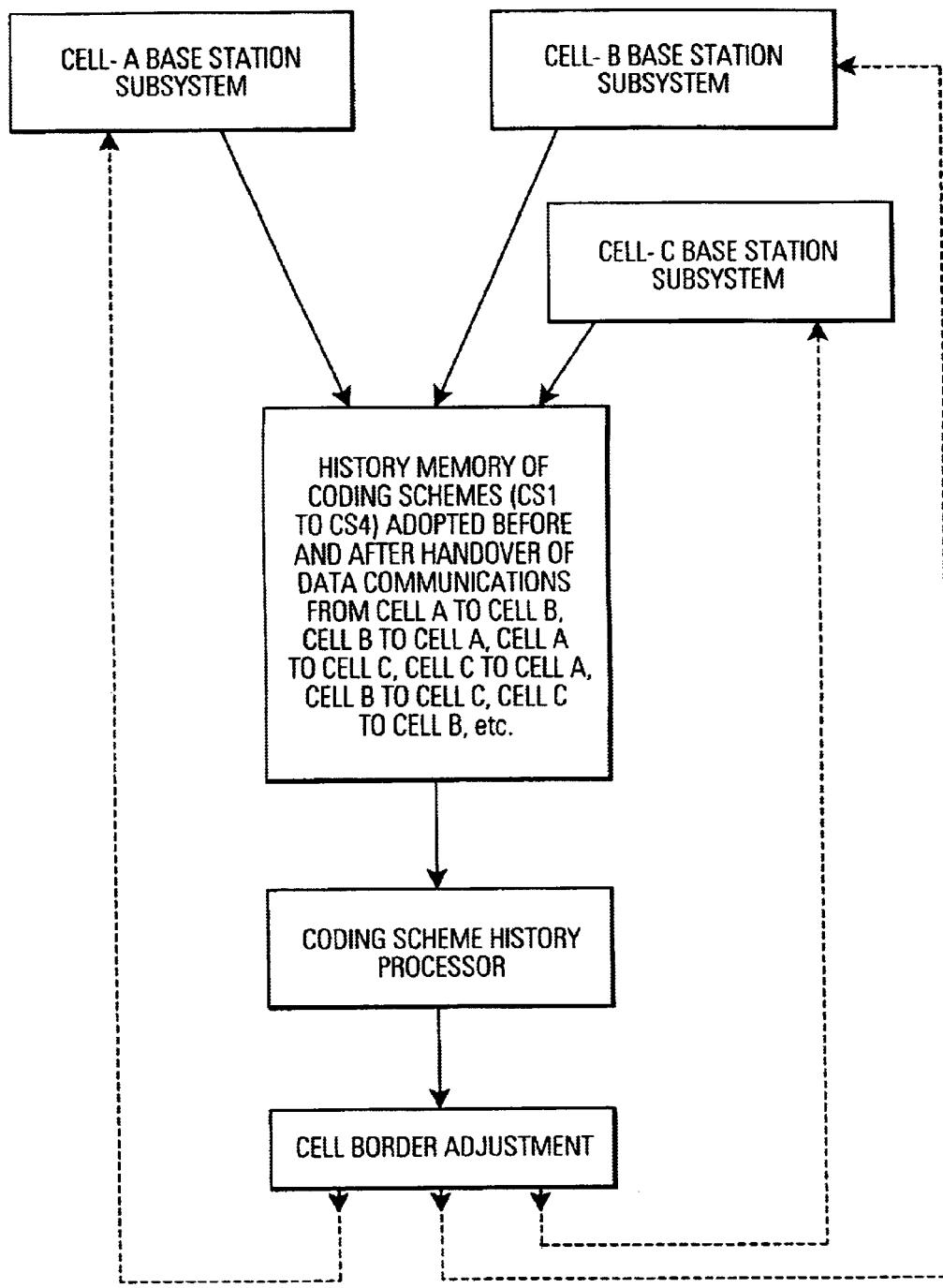
FIG. 5 is a simplified schematic block diagram of a system or apparatus in accordance with an embodiment of the present invention.

The simplified schematic block diagram of FIG. 5 illustrates components of a system based on GPRS and embodying the present invention, including a history memory which stores historical statistics of coding schemes (CS1 to CS4) adopted before and after cell handovers from cell A to cell B. In this example it is indicated that information used to build up the statistics is provided from the cell base station subsystems, but any other source of such information available in the system may be employed. The history memory may also store statistics relating to cell handovers from B to A, and store similar information for other adjacent cells pairs such as A and C, B and C, etc.

A coding scheme history processor is also provided which, on the basis of the stored historical statistics, analyzes and process those statistics to determine whether a change of cell border, for example between cells A and B, appears likely to be favourable. The form of analysis and processing carried out may be of any kind appropriate to the stored information.

The results of operation of the coding scheme history processor, in the form of cell border adaptations (if required) are then exploited in the base stations to adapt cell borders to provide a more efficient cell plan.

FIG. 6 is a simplified flow chart of the steps carried out in a method embodying the present invention.

What is claimed is:

1. A method of determining a cell border between first (A) and second (B) cells in a cellular communications system in which communications with mobile stations (1, 1H) can be effected at different effective transfer rates in dependence upon communication conditions with the mobile stations, and in which ongoing communications with the mobile stations can be handed over from the first cell (A) to the second cell (B), the method comprising storing information relating to the transfer rates of communications with mobile stations prior to cell handover of those communication from the first cell (A) to the second cell (B), storing information relating to transfer rates of the communications with mobile stations subsequent to the cell handover of the respective communications concerned from the first cell to the second cell (B), analyzing and processing the stored information, and in dependence thereupon determining the cell border between the first (A) and the second (B) cell such that, at communication handover, transfer rates before and after handover are more likely or most likely to be the same.

2. A method as claimed in claim 1, wherein the information relating to transfer rates is data concerning coding schemes adopted for those communications.

3. A method as claimed in claim 1, wherein the information relating to transfer rates is data concerning the GPRS coding schemes adopted by GPRS dynamic link functionality for those communications.

4. A GPRS cellular data communications system, operating in accordance with the method of claim 1.

5. Apparatus for determining a cell border between first (A) and second (B) cells in a cellular communications system in which communications with mobile stations (1, 1H) can be effected at different effective transfer rates in dependence upon communication conditions with the mobile stations, and in which on-going communications with the mobile stations can be handed over from the first cell (A) to the second cell (B), the apparatus comprising means for storing information relating to the transfer rates of communications with mobile stations prior to cell handover of those communication from the first cell (A) to the second cell (B), means for storing information relating to transfer rates of the communications with mobile stations subsequent to the cell handover of the respective communications concerned from the first cell to the second cell (B), means for analyzing and processing the stored information, and in dependence thereupon determining the cell border between the first (A) and the second (B) cell such that, at communication handover, transfer rates before and after handover are more likely or most likely to be the same.

6. Apparatus as claimed in claim 5, wherein said means for storing information relating to transfer rates store data concerning coding schemes adopted for those communications.

7. Apparatus as claimed in claim 6, in a GPRS cellular data communications system.

8. A GPRS cellular data communications system, including apparatus as claimed in claim 6.

9. Apparatus as claimed in claim 5, wherein said means for storing information relating to transfer rates store data concerning the GPRS coding schemes adopted by GPRS dynamic link functionality for those communications.

* * * * *